(12) United States Patent
Lalancette

(10) Patent No.: US 7,700,875 B2
(45) Date of Patent: Apr. 20, 2010

(54) SWITCH BOX EXTENDER GROUNDING STRAP

(75) Inventor: Daniel Lalancette, Saint-Jean-sur-Richelieu (CA)

(73) Assignee: Thomas & Betts International, Inc., Wilmington, DE (US)

( * ) Notice: Subject to any disclaimer, the term of this patent is extended or adjusted under 35 U.S.C. 154(b) by 462 days.

(21) Appl. No.: 11/644,379

(22) Filed: Dec. 22, 2006

(65) Prior Publication Data

US 2008/0308290 A1 Dec. 18, 2008

(51) Int. Cl.
*H05K 5/02* (2006.01)

(52) U.S. Cl. ............................ 174/51; 174/50; 174/481; 174/53; 220/3.2; 220/3.3; 439/535

(58) Field of Classification Search ................ 174/480, 174/481, 50, 53, 57, 58, 51, 17 R, 54, 61, 174/62, 5 R, 5 SG; 220/3.2–3.9, 4.02; 439/535, 439/536, 537, 92, 95; D13/152; 361/1, 219, 361/799
See application file for complete search history.

(56) References Cited

U.S. PATENT DOCUMENTS

| | | | |
|---|---|---|---|
| 2,378,861 A | 6/1945 | Peevey | |
| 2,989,206 A | 6/1961 | McAfee | |
| 3,651,245 A | 3/1972 | Moll | |
| 3,680,031 A | 7/1972 | Schumacher | |
| 3,720,783 A | 3/1973 | Moll | |
| 3,963,292 A | 6/1976 | Smith | |
| 4,223,796 A | 9/1980 | Silver | |
| 4,634,015 A | 1/1987 | Taylor | |
| 4,836,793 A | 6/1989 | Munroe | |
| 4,900,259 A | 2/1990 | Ludwig et al. | |
| 5,042,673 A | 8/1991 | McShane | |
| 5,117,996 A | 6/1992 | McShane | |
| 5,293,003 A | 3/1994 | Prairie, Jr. | |
| 5,704,804 A | 1/1998 | Robinson et al. | |
| 5,944,555 A | 8/1999 | Robinson et al. | |
| 5,959,246 A | 9/1999 | Gretz | |
| 5,975,323 A | 11/1999 | Turan | |
| 6,180,879 B1 | 1/2001 | Gretz | |
| 6,204,447 B1 | 3/2001 | Gretz | |
| 6,307,154 B1 | 10/2001 | Gretz | |
| 6,313,403 B1 | 11/2001 | Livingston et al. | |
| 6,369,322 B1 * | 4/2002 | Gretz | 174/50 |
| 6,734,355 B1 | 5/2004 | Auclair | |
| 6,820,760 B2 | 11/2004 | Wegner et al. | |
| 7,235,739 B2 * | 6/2007 | King et al. | 174/58 |
| 7,276,661 B2 * | 10/2007 | Wegner et al. | 174/58 |
| 7,410,072 B2 * | 8/2008 | Wegner et al. | 174/58 |

* cited by examiner

*Primary Examiner*—Angel R Estrada
(74) *Attorney, Agent, or Firm*—Hoffmann & Baron, LLP

(57) ABSTRACT

An electrical box extender with a grounding strap which includes an extender having a perimeter wall section and an integral bendable grounding strap connected to the wall section, wherein the grounding strap extends from the wall section and has a remote end that includes a spade or lug connector for attaching to a ground.

20 Claims, 5 Drawing Sheets

SWITCH BOX EXTENDER GROUNDING STRAP

FIELD OF THE INVENTION

The present invention relates to extenders with grounding straps for electrical boxes mounted in renovated walls or installed too deep in a wall. In particular, the invention relates to extenders with grounding straps that are used to modify electrical boxes and that can be easily and inexpensively manufactured.

BACKGROUND OF INVENTION

The use of grounded electrical boxes (also referred to herein as electrical outlet boxes or outlet boxes) for housing electrical devices and connecting wires is well known in the prior art. In new construction, an outlet box is typically attached to a wall stud and the front face of the box extends beyond the stud so that it will be flush with the surface of the wall. The box is then connected to a ground. For example, when the wall is formed from one-half inch thick sheet rock, the face of the box extends approximately one-half inch beyond the stud. When a receptacle is installed in the box and a cover plate attached, the cover plate lies flat on the surface of the wall.

However, the thickness of the wall can sometimes change when a new wall covering is installed over an existing wall. In these cases, the front face of an existing electrical box will not be flush with the new wall surface. In order to modify the boxes to fit the new wall thickness, a switch box extender must be attached to the box. Typically, the extender is made from sheet metal and it is attached to the front face of an existing metal outlet box so that the front face of the extender is flush with the surface of the new wall covering. Generally, no provision is made for grounding the extender.

When an extender is attached to an electrical box, the extender is ungrounded, except for the electrical ground path formed by the walls of the extender contacting the walls of the outlet box. This is not a reliable ground for the extender because the walls of the extender do not always tightly contact the outlet box to provide a continuous electrical connection. Presently, the electrical codes do not require the extenders to be grounded to the outlet box. Accordingly, the extenders that are being used do not have any provisions for grounding to the outlet box. Therefore, a reliable means of grounding the extender to the electrical box is needed. Therefore, it is desirable to provide a mounting bracket which allows for the use of a standard electrical box in old work or cut-in applications.

SUMMARY OF THE INVENTION

In accordance with the present invention, an electrical box extender with a grounding strap is provided, which includes: an extender having a perimeter wall section; and an integral bendable grounding strap connected to the wall section, which extends from the wall section and has a remote end. The perimeter wall section can be formed into a variety of shapes, including rectangular, square, round, oval, hexagonal or octagonal, to fit outlet boxes having different shapes. The remote end of the grounding strap can include a connector, preferably a spade or lug connector, and can be electrically connected to an electrical outlet box.

The electrical box extender and grounding strap are made from an electrically conductive metal and can be formed using a metal stamping process. In preferred embodiments, the grounding strap includes a plurality of sections and these sections can include a first section that extends outwardly from the rear edge of one of the wall sections and is connected to a second section that extends, in its unbent state, substantially parallel to the wall section, preferably, at least one of the sections of the grounding strap is curved.

In preferred embodiments, the electrical box extender and grounding strap also includes: a first member extending from the first end, a first embossed area on the first end, a second member extending from the second end, and a second embossed area on the second end. The first member is bent so that it contacts the second embossed area and the second member is bent so that it contacts the first embossed area to connect the first and second ends. In this manner, a structure with a perimeter wall is formed with an opening in the middle, which corresponds to the opening for an electrical outlet box.

BRIEF DESCRIPTION OF THE FIGURES

The preferred embodiments of the electrical box extender with a grounding strap, as well as other objects, features and advantages of this invention, will be apparent from the following detailed description, which is to be read in conjunction with the accompanying drawings wherein.

DETAILED DESCRIPTION OF THE INVENTION

Figure 1:
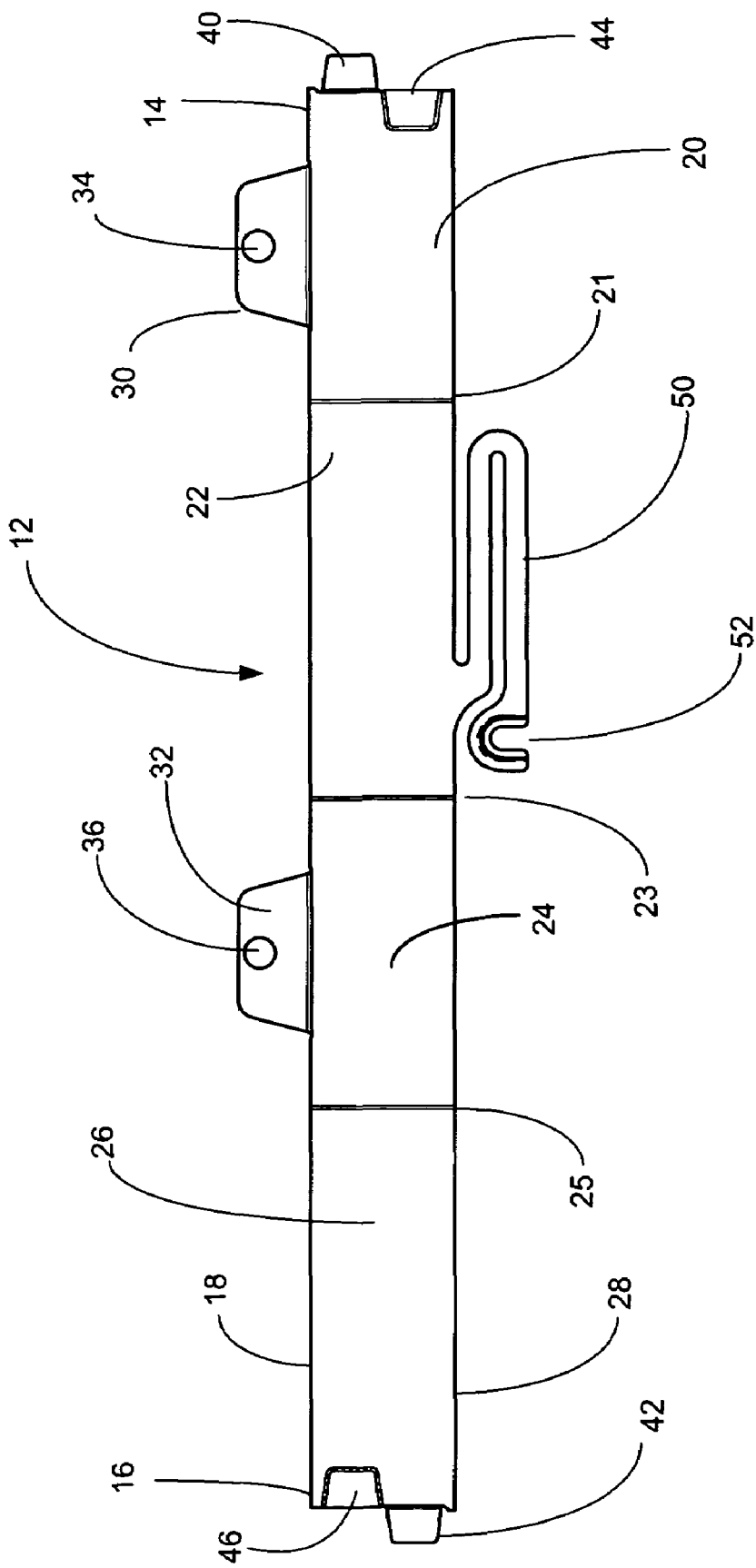
FIG. 1 is a side view of a side wall prior to forming an extender with a bendable grounding strap connected to one of the wall sections.

The present invention is an electrical outlet box extender with a bendable grounding strap that grounds the extender to the outlet box. The side walls of the extender can be formed into any shape that corresponds to the shape of the opening of an outlet box. The extender is inserted into the outlet box so that the outside walls of the extender contact the interior walls of the outlet box. The grounding strap is connected to one of the side walls of the extender on one end and has an electrical connector on the other end (also referred to herein as the remote end). Preferably, the extender and the grounding strap are integrally formed at the same time by a metal stamping process. The grounding strap is preferably made up of a plurality of connected sections and can have a curved or S-shape, which minimizes the amount of metal that is required to form the extender/grounding strap and also makes it easier to bend the grounding strap so as to extend it away from the wall section of the extender.

The grounding strap is preferably extended or reconfigured by bending the plurality of sections away from the extender prior to insertion of the extender in the outlet box. The plurality of sections allows the grounding strap to be configured so that the connector can contact the outlet box at a variety of locations. A first section of the grounding strap can extend outwardly from the rear edge of one of the wall sections and can connect to a second section which extends substantially parallel to the wall section. If desired, a third U-shaped section can be connected to the second section and a forth section connected to the third section can extend parallel to the second section in the opposing direction. Typically, an outlet box will have apertures for grounding the box at one or more points. However, if there is no aperture available in the outlet box, one can easily be provided by drilling a hole in one of the side walls or the back wall. Once the grounding strap is positioned over the aperture, the connector can be attached to the outlet box with a screw. This provides an electrical ground for the extender. In the event that an unshielded wire in the outlet box contacts the extender, the grounding strap will prevent injury to a user.

The extender and grounding strap can be formed as a unitary construction from a piece of sheet metal using well know metal stamping methods. In preferred embodiments, the grounding strap is substantially flat and extends outwardly from the wall section of the extender and then parallel to the wall section with one or more U-curves. This reduces the amount of sheet metal that is needed to make the extender/grounding strap. The sheet metal is electrically conductive, preferably carbon or galvanized steel, and has a thickness which allows it to be bent, preferably a thickness of from about 10 to about 28 gauge (i.e., about 0.1345 inches to about 0.0149 inches), most preferably from about 20 to about 24 gauge (i.e., about 0.0359 inches to about 0.0239 inches). The grounding strap is made from a metal that can be bent without breaking and that will substantially retain its shape after it has been bent. The bending is preferably done using a tool, such as a pliers or vice grip.

The invention is now described in more detail with reference to the drawings. FIG. 1 shows the die stamped side wall 12, which is used to form the extender 10 and the grounding strap 50. The side wall 12 is substantially rectangular in shape and has first and second ends 14, 16 and first and second side edges 18, 28, which correspond to the front and rear edges of the extender 10 when it is formed (see FIG. 2). The side wall 12 is die stamped to form four wall sections 20, 22, 24, 26, which are separated by bending points 21, 23, 25. The bending points 21, 23, 25 are spaced to form a first pair of wall sections 20, 24 having substantially the same length and a second pair of wall sections 22, 26 having substantially the same length. Grooves can be made at the bending points 21, 23, 25 to facilitate bending the side wall 12 to form the extender 10.

The first and second ends 14, 16 of the side wall 12 have a first member 40 and a second member 42, respectively, extending outwardly from the ends of the side wall 12. The first member 40 is located between the longitudinal axis of the side wall 12 and the first edge 18 and the second member 42 is located between the longitudinal axis and the second edge 28. The first end 14 also has a first embossed area 44 located between the longitudinal axis and the second edge 28 and the second end 16 has a second embossed area 46 located between the longitudinal axis of the side wall 12 and the first edge 18. When the side wall 12 is bent along the bending points 21, 23, 25 to form the extender 10, the first member 40 corresponds with the second embossed area 46 and the second member 42 corresponds with the first embossed area 44.

A pair of tabs 30, 32 extend from the first edge 18 of two wall sections 20, 24. Each tab 30, 32 includes an aperture 34, 36. When the extender 10 is formed from the side wall 12, the tabs 30, 32 are bent about 90 degrees so that they are substantially perpendicular to the exterior surfaces of the wall sections 20, 24 (see FIG. 4). The apertures 34, 36 in the tabs 30, 32 correspond to the mounting hole apertures in an existing electrical box. When the extender 10 is attached to an existing electrical box (see FIG. 6), the mounting screws (not shown) pass through the apertures 34, 36.

Figure 7:
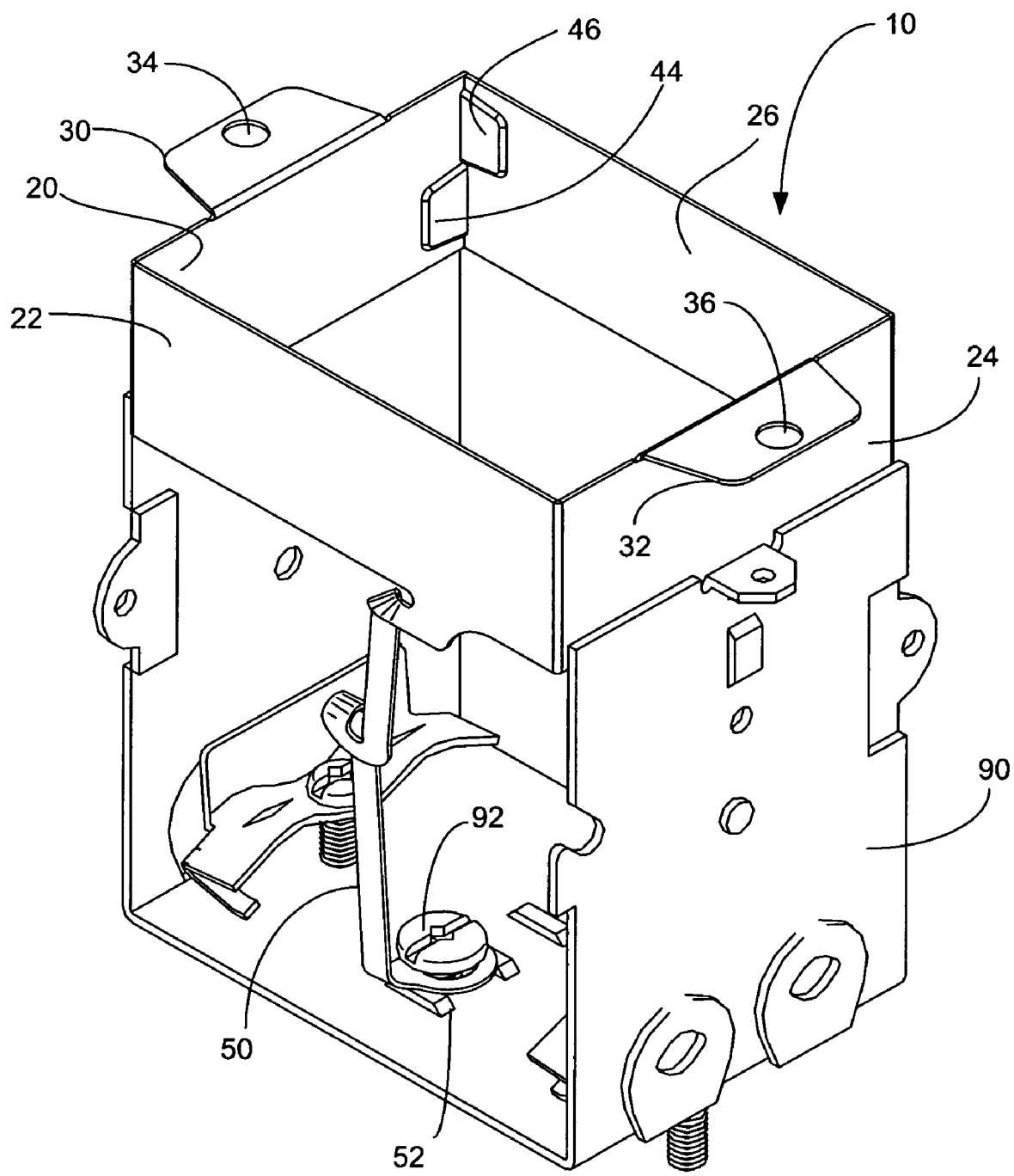
FIG. 7 is a peripheral view of an extender with a bendable grounding strap and an electrical outlet box after they are joined together.

The grounding strap 50 extends outwardly from, and preferably parallel to, the second side edge 28 of one of the wall sections 22. The grounding strap 50 can have a plurality of sections or portions and, in preferred embodiments, at least one of the sections is curved. The grounding strap 50 can also have a connector 52 at the remote end, preferably a spade or lug connector, for attaching the grounding strap 50 to an electrical outlet box 90 (see FIG. 7). Attaching the connector 52 to the outlet box 90 ensures a permanent and reliable ground for the extender 10. The grounding strap 50 is preferably stamped out of the same piece of sheet metal as the extender 10 and the sheet metal is thin enough to allow the grounding strap 50 to be easily bent into different configurations. This facilitates bending the grounding strap 50 so that it can be connected to different locations and to different types of outlet boxes 90.

Figure 2:
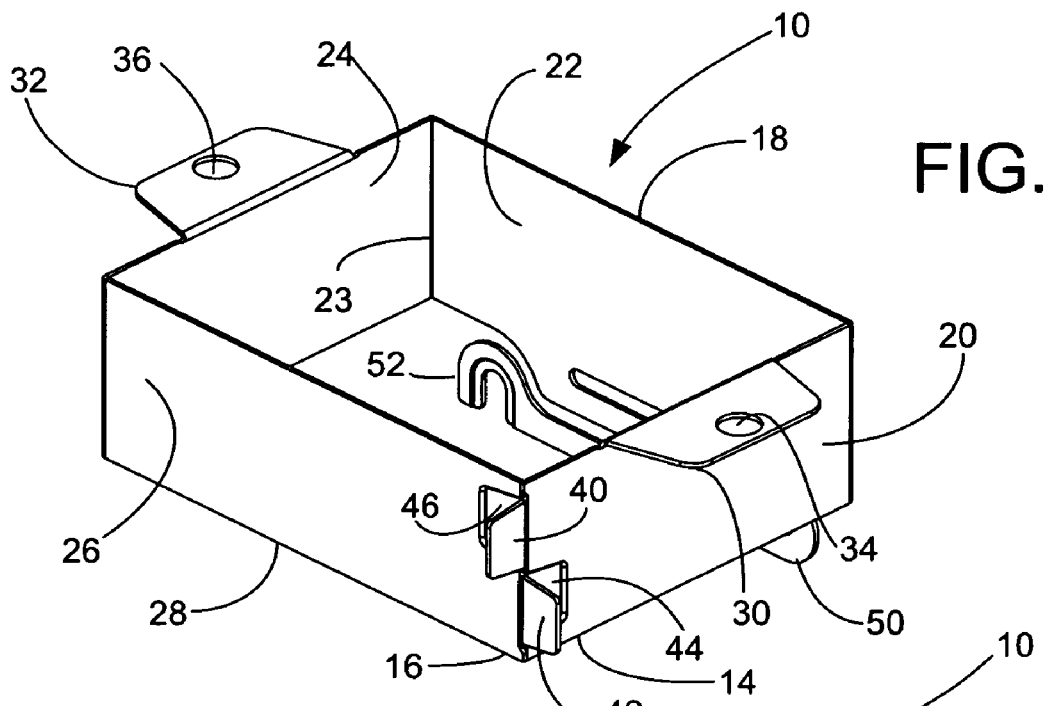
FIG. 2 is a peripheral view of the side wall shown in FIG. 1 after it has been configured to form an extender with a bendable grounding strap.

FIG. 2 shows a rectangular-shaped embodiment of the extender 10 after the side wall 12 has been bent along the three bending points 21, 23, 25 and before the first and second members 40, 42 have engaged the first and second embossed areas 44, 46. In preferred embodiments, the embossed areas 44, 46 have a sufficient depth so that, when the members 40, 42 are folded into the embossed areas 44, 46, the surface of the members 40, 42 substantially correspond to the surface of the wall sections 20, 24. The first edge 18 of the side wall 12 forms the front edge of the extender 10. The tabs 30, 32 on the opposing wall sections 20, 24 are bent so that they are substantially perpendicular to the exterior surfaces of the wall sections 20, 24. When the extender 10 is attached to an existing electrical box (see FIG. 7), the front edge 18 is substantially flush with the surface of the wall. The grounding strap 50 and the connector 52 are substantially flat and in the same plane as the wall section 22 when the extender 10 is formed.

Figure 3:
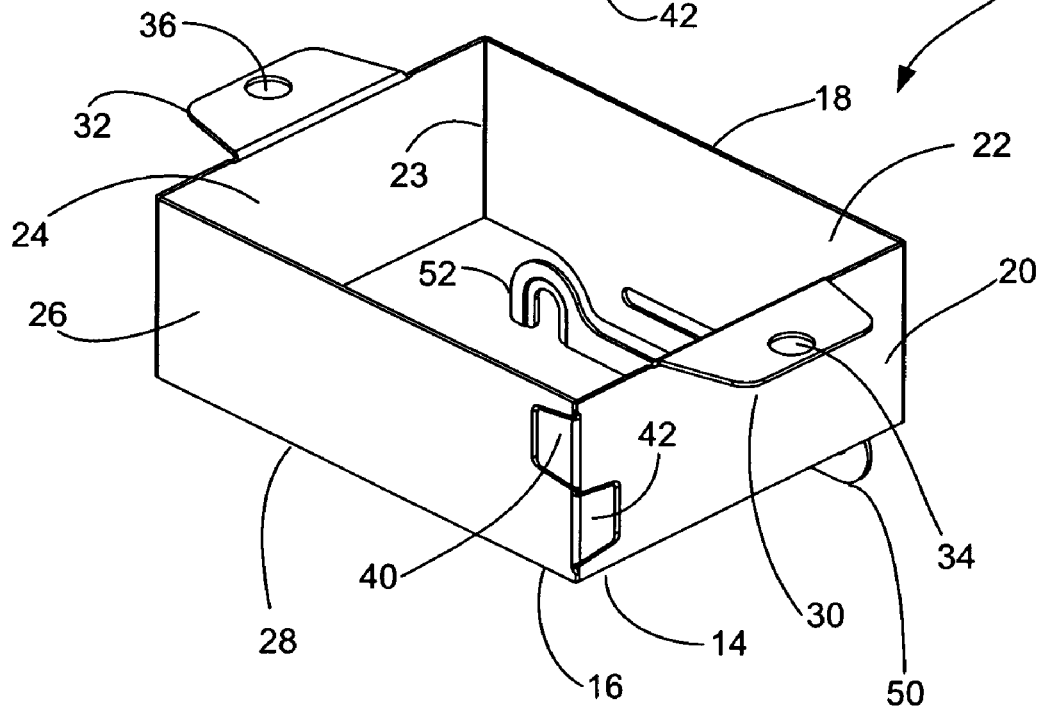
FIG. 3 is a peripheral view of an extender with a bendable grounding strap after it has been formed from the side wall shown in FIG. 1.
Figure 4:
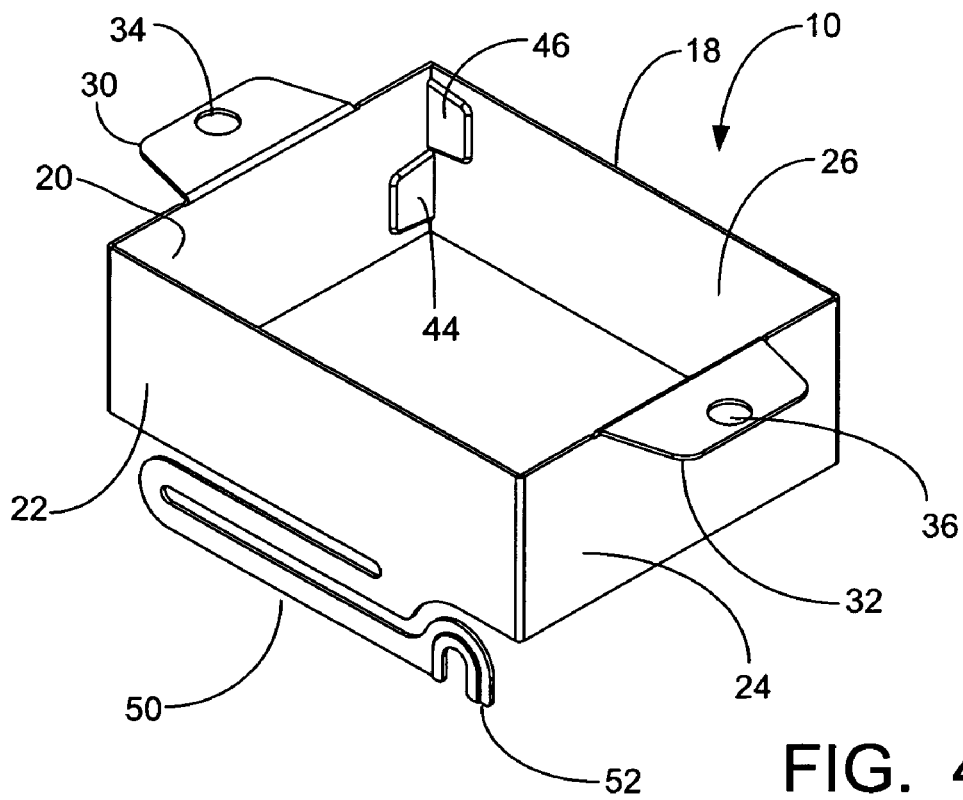
FIG. 4 is a peripheral view of an extender with the bendable grounding strap unextended.

FIG. 3 shows a rectangular-shaped embodiment of the extender 10 after the first and second members 40, 42 have engaged the first and second embossed areas 44, 46. The extender 10 is assembled and ready to be attached to an existing electrical box. FIG. 4 shows the extender 10 in FIG. 3 from the opposite side. The first and second embossed areas 44, 46 are shown extending from the interior surface of the wall sections 20, 26. The recesses on the exterior surface of the wall sections 20, 26 provided by the embossed areas 44, 46 allow the members 40, 42 to be flush with the outer surface of the wall sections 20, 26 when the members 40, 42 are bent into the embossed areas 44, 46. The grounding strap 50 extends downwardly from the rear edge 28 of the extender 10. When the extender 10 is inserted in an outlet box 90, the grounding strap 50 is oriented towards the back of the outlet box 90, away from the front opening.

Figure 5:
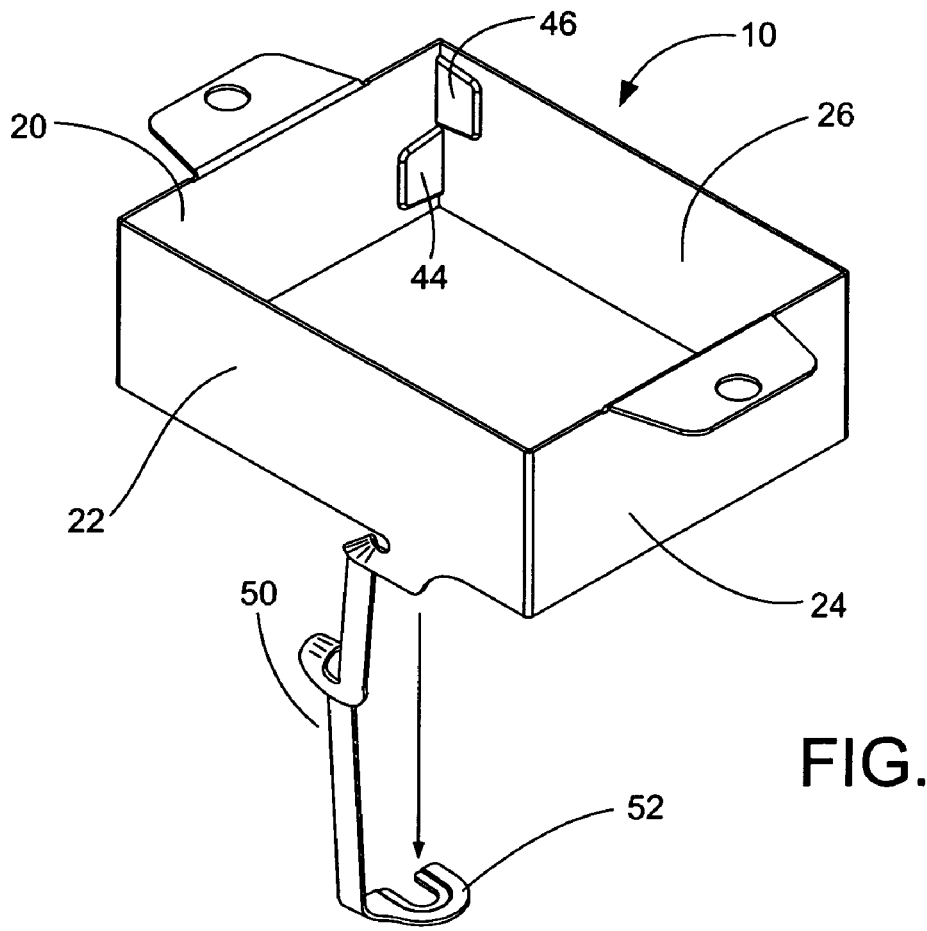
FIG. 5 is a peripheral view of an extender with the bendable grounding strap extended.

When the extender 10 is inserted into an outlet box 90, the grounding strap 50 is also inserted inside the box 90. The grounding strap 50 is preferably bent away from the wall section 22 before the extender 10 is inserted into the outlet box 90. This offers the advantage of allowing the installer unrestricted ability to use tools, such as a pliers, to bend the grounding strap 50. Once the extender 10 is inserted into an outlet box 90, it is more difficult for the installer to use tools within the confines of the outlet box 90. FIG. 5 shows the grounding strap 50 after it has been bent in three places to increase its length and so that the connector 52 is at a right angle to the grounding strap 50. Preferably, the configuration of the grounding strap 50 in FIG. 5 allows the connector 52 to be attached to the back wall of an outlet box 90 (see FIG. 7).

Figure 6:
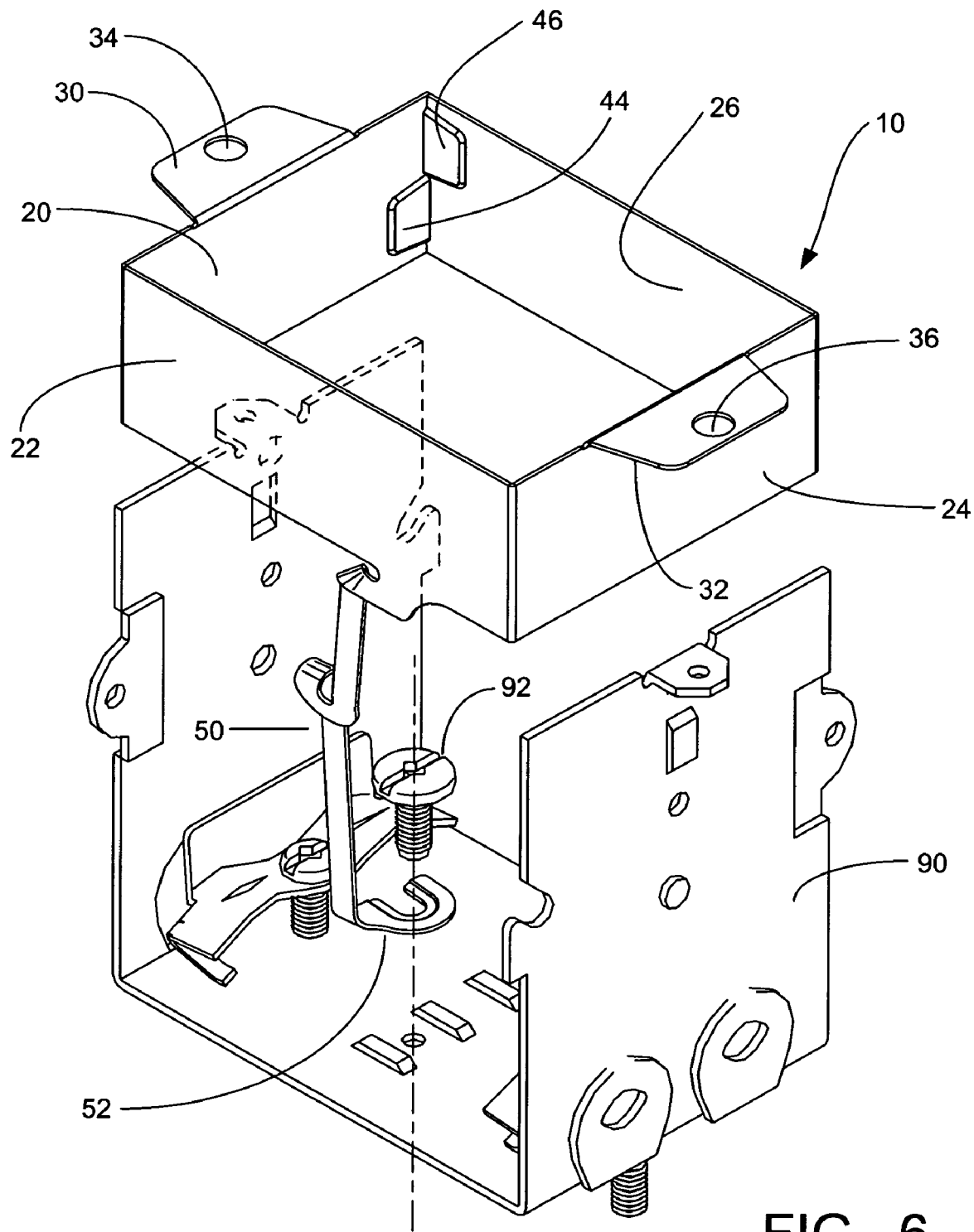
FIG. 6 is a peripheral view of an extender with a bendable grounding strap and an electrical outlet box before they are joined together.

FIG. 6 shows the extender 10 and grounding strap 50 positioned above an outlet box 90 prior to installation. The side walls of the outlet box have been removed to allow the interior to be viewed. The grounding strap 50 and the connector 52 line up with an aperture in the back wall of the outlet box 90. The bends in the grounding strap 50 are adjusted so that when the extender 10 is snugly inserted into the outlet box 90, the connector 52 is in contact with the back wall. The screw 92 is then inserted into the aperture and tightened to provide a secure electrical connection between the extender 10 and the outlet box 90.

The extender 10 is shown attached to the rectangular outlet box 90 in FIG. 6. The grounding strap 50 is connected to the back wall of the outlet box 90 by screw 92. In this configuration, the grounding strap 50 not only provides a ground for the extender 10, but it also helps to secure the extender 10 to the outlet box 90. One of ordinary skill in the art would understand that the grounding strap 50 can be bent in various shapes so that it can be connected to apertures at various locations in the outlet box 90. Moreover, the size and shape of the grounding strap 50 can be altered to fit outlet boxes 90 of different styles and sizes, for example round, square or octagonal boxes.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

I claim:

1. An electrical box extender with a grounding strap for an electrical box having a plurality of side walls extending from a back wall to an open front, the extender comprising:
    an extender having a perimeter wall section; and
    an integral bendable grounding strap connected to the wall section, wherein the grounding strap extends from the wall section and has a remote end,
    wherein the perimeter wall section of the extender is adapted to be received by the open front and contact the side walls of the electrical box, and wherein the grounding strap is adapted to be attached to the back wall.

2. The electrical box extender with a grounding strap according to claim 1, wherein the remote end of the grounding strap comprises a connector.

3. The electrical box extender with a grounding strap according to claim 2, wherein the connector is a spade or lug connector.

4. The electrical box extender with a grounding strap according to claim 1, wherein the electrical box extender and grounding strap are made from an electrically conductive metal.

5. The electrical box extender with a grounding strap according to claim 1, wherein the remote end of the grounding strap can be electrically connected.

6. The electrical box extender with a grounding strap according to claim 1, wherein the grounding strap comprises a plurality of sections.

7. The electrical box extender with a grounding strap according to claim 1, wherein the side wall and grounding strap are formed using a metal stamping process.

8. The electrical box extender with a grounding strap according to claim 1, wherein the grounding strap extends outwardly from the rear edge of one of the wall sections.

9. The electrical box extender with a grounding strap according to claim 1, wherein the grounding strap comprises a plurality of sections, and wherein a first section extends outwardly from the rear edge of one of the wall sections and is connected to a second section which extends in its unbent state substantially parallel to the wall section.

10. The electrical box extender with a grounding strap according to claim 7, wherein at least one of the sections is curved.

11. An electrical box extender with a grounding strap for an electrical box having a plurality of side walls extending from a back wall to an open front, the extender comprising:
    an extender having a perimeter side wall comprising at least one wall section; and
    an integral bendable grounding strap connected to one of the wall sections, wherein the grounding strap extends from the wall section and has a remote end,
    wherein the perimeter side wall of the extender is adapted to be received by the open front and contact the side walls of the electrical box, and wherein the grounding strap is adapted to be attached to the back wall.

12. The electrical box extender with a grounding strap according to claim 11, wherein the remote end of the grounding strap comprises a connector.

13. The electrical box extender with a grounding strap according to claim 12, wherein the connector is a spade or lug connector.

14. The electrical box extender with a grounding strap according to claim 11, wherein the electrical box extender and grounding strap are made from an electrically conductive metal.

15. The electrical box extender with a grounding strap according to claim 11, wherein the remote end of the grounding strap can be electrically connected.

16. The electrical box extender with a grounding strap according to claim 11, wherein the grounding strap comprises a plurality of sections.

17. The electrical box extender with a grounding strap according to claim 11, wherein the side wall and grounding strap are formed using a metal stamping process.

18. The electrical box extender with a grounding strap according to claim 11, wherein the grounding strap extends outwardly from the rear edge of one of the wall sections and is connected to a second section which extends in its unbent state substantially parallel to the wall section.

19. An electrical box extender with a grounding strap for an electrical box having a plurality of side walls extending from a back wall to an open front, the extender consisting essentially of:
    an extender having a perimeter wall section; and
    an integral bendable grounding strap connected to the wall section, wherein the grounding strap extends from the wall section and has a remote end,
    wherein the perimeter side wall of the extender is adapted to be received by the open front and contact the side walls of the electrical box, and wherein the grounding strap is adapted to be attached to the back wall.

20. The electrical box extender with a grounding strap according to claim 19, wherein the remote end of the grounding strap comprises a connector.

* * * * *